(12) United States Patent
Yin (10) Patent No.: US 10,908,770 B2
(45) Date of Patent: *Feb. 2, 2021

(54) PERFORMING VIRTUAL REALITY INPUT (71) Applicant: ADVANCED NEW TECHNOLOGIES CO., LTD., George Town (KY)

(72) Inventor: Huanmi Yin, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/697,974

(22) Filed: Nov. 27, 2019

(65) Prior Publication Data

US 2020/0097156 A1  Mar. 26, 2020

Related U.S. Application Data

(63) Continuation of application No. 15/792,628, filed on Oct. 24, 2017, now Pat. No. 10,509,535.

(30) Foreign Application Priority Data

Oct. 26, 2016 (CN) .......................... 2016 1 0951000

(51) Int. Cl.
*G06F 3/0481* (2013.01)
*G06F 3/0482* (2013.01)
(Continued)

(52) U.S. Cl.
CPC .......... *G06F 3/04815* (2013.01); *G06F 3/011* (2013.01); *G06F 3/012* (2013.01);
(Continued)

(58) Field of Classification Search
CPC .................................. G06F 3/04815
(Continued)

(56) References Cited

U.S. PATENT DOCUMENTS 5,612,719 A * 3/1997 Beernink ............ G06F 3/04883
345/172
5,737,533 A * 4/1998 de Hond ................. G06F 16/10
709/219
(Continued)

FOREIGN PATENT DOCUMENTS

CN  101523331  9/2009
CN  103442244  12/2013
(Continued)

OTHER PUBLICATIONS

European Extended Search Report in European Patent Application No. 17864668.3, dated Sep. 13, 2019, 8 pages.
(Continued)

*Primary Examiner* — Daniel Rodriguez
(74) *Attorney, Agent, or Firm* — Fish & Richardson P.C.

(57) ABSTRACT

A virtual reality (VR) device presents a virtual element in a VR scenario of a VR application. An effective interaction region (EIR) of the virtual element is determined that the virtual element can effectively interact with. A trajectory of an operational focus of the VR application is determined based on a movement sensed by the VR device. The virtual element is selected if an interaction between the trajectory of the operational focus and the EIR satisfies one or more conditions for triggering a selection event of the virtual button.

8 Claims, 7 Drawing Sheets

(51) Int. Cl.
*G06F 3/01* (2006.01)
*G06F 3/023* (2006.01)
*G06F 3/0484* (2013.01)
*G06T 19/00* (2011.01)

(52) U.S. Cl.
CPC ............ *G06F 3/017* (2013.01); *G06F 3/0236* (2013.01); *G06F 3/0482* (2013.01); *G06F 3/04842* (2013.01); *G06T 19/003* (2013.01)

(58) Field of Classification Search
USPC .......................................................... 715/850
See application file for complete search history.

(56) References Cited

U.S. PATENT DOCUMENTS

| | | | |
|---|---|---|---|
| 6,154,723 A | 11/2000 | Cox et al. | |
| 6,195,104 B1 | 2/2001 | Lyons | |
| 6,480,207 B1* | 11/2002 | Bates .................... | G06F 3/0481 715/756 |
| 6,842,175 B1* | 1/2005 | Schmalstieg ........... | G06F 3/011 345/427 |
| 7,050,078 B2* | 5/2006 | Dempski .............. | G02B 27/017 715/700 |
| 7,523,418 B2* | 4/2009 | Trewin ................ | G06F 3/04812 345/157 |
| 7,561,143 B1 | 7/2009 | Milekic | |
| 8,665,233 B2* | 3/2014 | Moon .................... | G06F 3/0418 345/173 |
| 9,823,764 B2* | 11/2017 | Schwesinger ........... | G06F 3/017 |
| 9,829,979 B2* | 11/2017 | Brombach .......... | G06F 3/04817 |
| 10,509,535 B2 | 12/2019 | Yin | |
| 2003/0156145 A1* | 8/2003 | Hullender ........... | G06F 3/04883 715/863 |
| 2005/0060658 A1* | 3/2005 | Tsukiori ................ | G06F 3/0481 715/765 |
| 2009/0138830 A1* | 5/2009 | Borgaonkar ........ | G06F 3/04883 715/863 |
| 2009/0249203 A1* | 10/2009 | Tsuruta ................ | G06F 3/0483 715/702 |
| 2009/0303187 A1* | 12/2009 | Pallakoff ............ | G06F 3/04886 345/169 |
| 2010/0085318 A1* | 4/2010 | Lee ...................... | G06F 3/0482 345/173 |
| 2010/0192109 A1* | 7/2010 | Westerman ........... | G06F 3/0488 715/863 |
| 2010/0194694 A1* | 8/2010 | Kraft .................... | G06F 3/04883 345/173 |
| 2011/0061078 A1* | 3/2011 | Rothschild ......... | H04N 21/8186 725/51 |
| 2011/0221669 A1* | 9/2011 | Shams ............... | G06Q 30/0261 345/156 |
| 2011/0252346 A1* | 10/2011 | Chaudhri ............ | G06F 3/04886 715/765 |
| 2011/0298831 A1* | 12/2011 | Fujita .................. | H04N 21/431 345/661 |
| 2012/0113033 A1* | 5/2012 | Kawamura ......... | G06F 3/04886 345/173 |
| 2012/0162103 A1* | 6/2012 | Kobayashi .......... | G06F 3/04845 345/173 |
| 2012/0256858 A1* | 10/2012 | Sudo ...................... | G06F 3/018 345/173 |
| 2013/0050109 A1* | 2/2013 | Ban ..................... | G06F 3/04883 345/173 |
| 2013/0097564 A1* | 4/2013 | Morikawa ........... | G06F 3/04886 715/856 |
| 2013/0152023 A1* | 6/2013 | Morikawa ........... | G06F 3/04812 715/862 |
| 2014/0002443 A1 | 1/2014 | Cunningham | |
| 2014/0059455 A1* | 2/2014 | Abdukalykov ..... | G06F 3/04842 715/764 |
| 2014/0351753 A1 | 11/2014 | Shin et al. | |
| 2014/0370967 A1* | 12/2014 | Snow .................. | G07F 17/3293 463/25 |
| 2014/0380230 A1 | 12/2014 | Venable et al. | |
| 2015/0062003 A1* | 3/2015 | Rafii ....................... | G06F 3/017 345/156 |
| 2015/0153834 A1* | 6/2015 | Akiyama .............. | G06F 3/0481 345/156 |
| 2015/0169076 A1* | 6/2015 | Cohen ................... | G06F 3/0304 345/156 |
| 2015/0185825 A1 | 7/2015 | Mullins | |
| 2015/0205494 A1 | 7/2015 | Scott et al. | |
| 2015/0242067 A1* | 8/2015 | Ainslie ................. | G06F 3/0418 715/815 |
| 2016/0042566 A1* | 2/2016 | Mao ...................... | A63F 13/825 463/32 |
| 2016/0062632 A1* | 3/2016 | Adams .................. | G06F 1/1626 715/763 |
| 2016/0162181 A1* | 6/2016 | Xu .......................... | G06F 3/018 715/773 |
| 2016/0249043 A1* | 8/2016 | Deng .................... | H04N 13/344 |
| 2017/0068416 A1* | 3/2017 | Li ........................ | G06F 3/04812 |
| 2018/0225837 A1* | 8/2018 | Liu ..................... | G06K 9/00671 |
| 2018/0335925 A1* | 11/2018 | Hsiao ..................... | G06F 3/013 |
| 2018/0364802 A1* | 12/2018 | Cederlund ............. | G06F 3/038 |
| 2019/0132529 A1* | 5/2019 | Ito ........................ | H04N 13/189 |
| 2020/0042280 A1* | 2/2020 | Li .......................... | G06F 3/0481 |

FOREIGN PATENT DOCUMENTS

| | | |
|---|---|---|
| CN | 104360751 | 2/2015 |
| CN | 105224084 | 1/2016 |
| CN | 105955461 | 9/2016 |
| CN | 105955471 | 9/2016 |
| JP | 2013120487 | 6/2013 |
| JP | 2014092940 | 5/2014 |
| JP | 2014186361 | 10/2014 |
| JP | 2016509705 | 3/2016 |
| KR | 20090021876 | 3/2009 |
| KR | 20100037945 | 4/2010 |
| KR | 20150059466 | 6/2015 |
| WO | WO 2014181380 | 11/2014 |
| WO | WO 2015030264 | 3/2015 |

OTHER PUBLICATIONS

International Preliminary Report on Patentability in International Application No. PCT/US2017/058520, dated Jan. 11, 2019, 18 pages.
International Search Report and Written Opinion of the International Searching Authority issued in International Application No. PCT/US2017/058520 dated Jan. 3, 2018; 7 pages.

* cited by examiner

PERFORMING VIRTUAL REALITY INPUT

This application is a continuation of U.S. patent application Ser. No. 15/792,628, filed on Oct. 24, 2017, which claims priority to Chinese Patent Application No. 201610951000.9, filed on Oct. 26, 2016, and each application is hereby incorporated by reference in its entirety.

TECHNICAL FIELD

This disclosure relates to virtual reality input methods.

BACKGROUND

Virtual reality (VR) is a computer technology that uses VR devices, such as headsets, sometimes in combination with physical spaces or multi-projected environments, to generate realistic images, sounds, and other sensations that simulate a user's physical presence in a three-dimensional (3D) virtual environment and allow the VR user to interact with the virtual environment. Many applications such as gaming, content consuming, and productivity have been developed using VR technology to provide user a more immersive experience.

In some cases, when a user needs to select a virtual element (for example, a virtual key) in a VR user interface (UI) to interact with a VR scenario, the user can select the virtual element in the VR UI by using an external device connected to the VR device. The external device connected to the VR device can be a smartphone, a joystick, or other handheld input devices. When using a VR application, the user can use the external device to control an operational focus (for example, a cursor) in the VR UI, move the operational focus to a virtual element, and select the virtual element in the UI by clicking a button or touchscreen on the external device.

In some cases, a clicking action can be simulated using a "hover timeout" event to select the virtual element in the VR UI. That is, a virtual element can be selected by hovering the operational focus on the virtual element for a pre-determined duration (for example, a three second timeout). When the operational focus stays on the virtual element for the duration, the virtual element is selected. Because the user needs to wait for a period of time to select the element, this method may not be suitable for VR applications that require real-time responses.

SUMMARY

The present disclosure describes methods and systems, including computer-implemented methods, computer program products, and computer systems for performing input in virtual reality applications.

In an implementation, a virtual reality (VR) device presents a virtual element in a VR scenario of a VR application. An effective interaction region (EIR) of the virtual element is determined that the virtual element can effectively interact with. A trajectory of an operational focus of the VR application is determined based on a movement sensed by the VR device. The virtual element is selected if an interaction between the trajectory of the operational focus and the EIR satisfies one or more conditions for triggering a selection event of the virtual button.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize selection of virtual elements in a virtual reality scenario in real-time to improve user experience when using VR applications.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes virtual reality input methods, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined herein can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Virtual reality (VR) is a computer technology that uses VR devices, such as headsets, sometimes in combination with physical spaces or multi-projected environments, to generate realistic images, sounds, and other sensations that simulate a user's physical presence in a three-dimensional (3D) virtual environment and allows the user to interact with the 3D virtual environment. Many applications such as gaming, content consuming, and productivity have been developed using VR technology to provide user a more immersive and interactive experience.

In some cases, when a user needs to select a virtual element (for example, a virtual key in a VR user interface (UI)) to interact with a VR scenario, the user can select the virtual element in the VR UI by using an external device connected to the VR device. In some implementations, the external device connected to the VR device can be a smartphone, a joystick, or other handheld input devices. When using a VR application, the user can use the external device to control an operational focus (for example, a cursor) in the VR UI, move the operational focus to a virtual element, and select the virtual element in the UI by clicking a button or touchscreen on the external device.

In some cases, a clicking action can be simulated using a "hover timeout" event to select the virtual element in the VR UI. That is, a virtual element can be selected by hovering the operational focus on the virtual element for a pre-determined duration (for example, a three second timeout). When the operational focus stays on the virtual element for the duration, the virtual element is selected. Because the user needs to wait for a period of time to trigger the selection of the virtual element, this method may not be suitable for VR applications that require user interaction in real-time.

The present disclosure discloses a method of selecting virtual elements in a VR scenario. The operational focus (for example, a virtual cursor) is tracked in a VR scenario, and a trajectory of the operational focus is generated. A virtual element can be selected when the trajectory of the operational focus passes through a region where the virtual element is located, to trigger a selection event. As such, when a user is wearing a VR device to enjoy an immersive VR experience, they can select virtual elements by controlling the trajectory of the operational focus to pass through spatial regions of the virtual environment where the virtual elements are located. The virtual elements can be selected in real-time so as to improve user experience in using VR applications.

Figure 1:
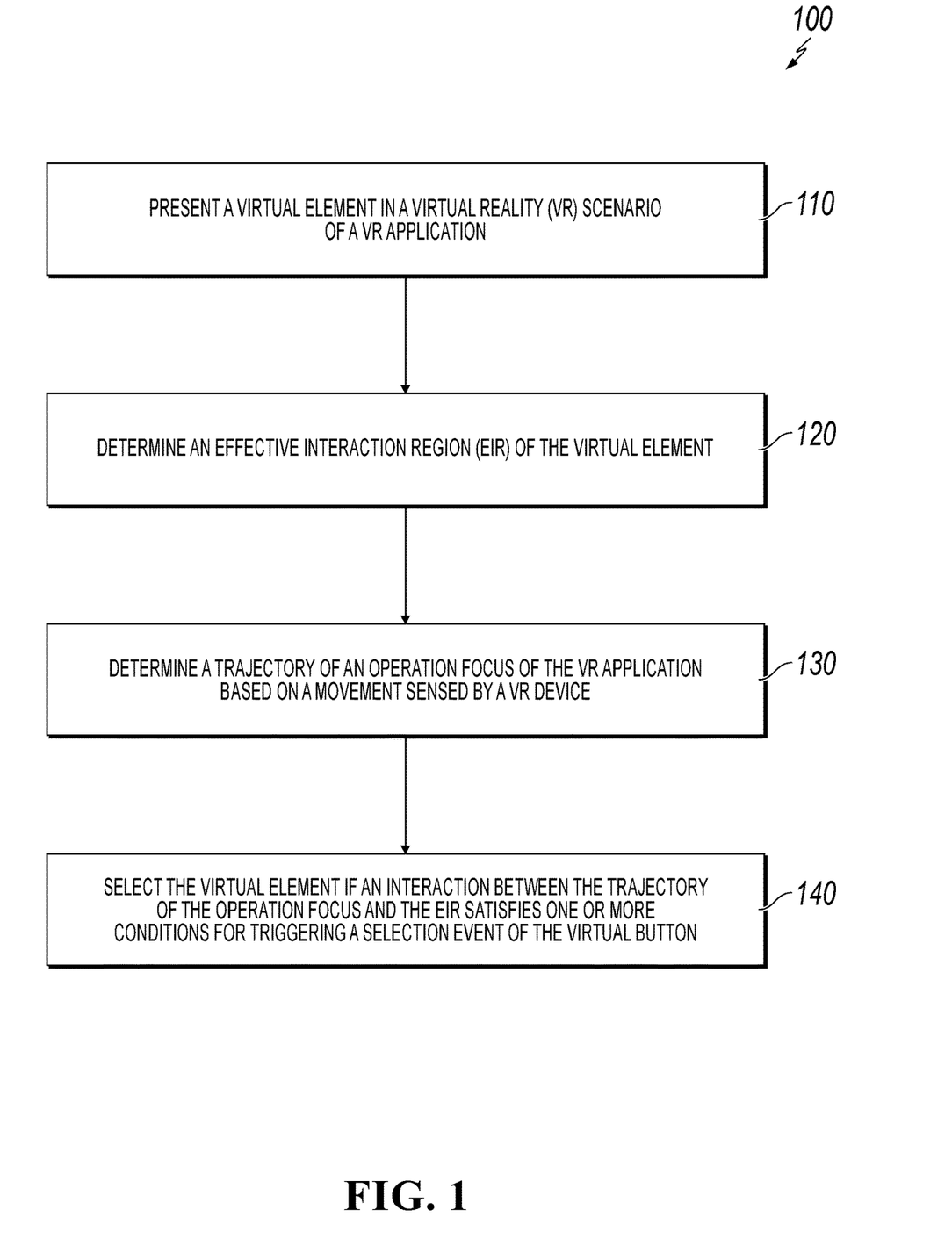
FIG. 1 is a flowchart illustrating an example of an input method based on a VR scenario, according to an implementation of the present disclosure.

FIG. 1 is a flowchart illustrating an example input method 100 based on a VR scenario, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 110, a virtual element in a VR scenario of a VR application is presented. Method 100 can be performed by a VR device. A VR application can be software or an application that is developed based on VR technology and can provide the VR device user with a 3D immersive user experience. The VR application can present VR scenarios generated by the VR device to the user. The VR scenario can include one or more virtual elements that can be selected to perform or control the VR application. For example, a virtual element can be a virtual button, a virtual key, or a pattern generated on a VR scenario to be used by the user to interact with the VR application (such as, input of information or initiation of a service).

The service can be a task or function supported by a VR application. For example, the service can be a payment service, such as payment made in VR shopping, VR games, VR-based video-on-demand, or donation to a VR live cast. In some implementations, a virtual element for the payment service can be a virtual payment button that can be selected to initiate or perform the payment service. After the payment service is initiated, the VR device can present an input UI in the VR scenario for the user to input payment information, such as user ID and password. The virtual element can be a virtual key presented on the input UI. After 110, method 100 proceeds to 120.

At 120, an effective interaction region (EIR) of the virtual element is determined. The region that a user can interact with to select the virtual element can be called an EIR of the virtual element. In some implementations, the EIR of the virtual element can be an area that overlaps with at least a portion of the area of the virtual element shown in the VR scenario. For example, when the virtual element is a rectangular virtual button, an area that covers at least part of the rectangle can be the EIR.

The VR scenario and the included virtual elements can be created by VR modeling operations (such as, using a modeling tool, such as UNITY, 3D SMAX, or PHOTOSHOP) In some cases, the VR modeling and VR scenario texture mapping can be based on real life scenarios. For example, texture maps of materials and real life scenario models can first be collected by photographing real life objects or scenarios. Modeling tools such as PHOTOSHOP or 3DMAX can be used for texture processing and real-life 3D model creation. The 3D model can be imported to a UNITY3D (U3D) platform and multi-dimensionally rendered through sound effects, graphical interfaces, plug-ins, and lighting. Interaction code can be executed to convert the 3D model to the VR scenario model. After VR scenario modeling, the VR device can output the VR scenario and the included virtual elements to the user. From 120, method 100 proceeds to 130.

At 130, a trajectory of an operational focus of the VR application based on a movement sensed by the VR device is determined. A virtual element can be selected by triggering a selection event. A selection event can be triggered by controlling a trajectory of an operational focus to pass through the EIR. As such, the user can select the virtual element in real-time in the VR scenario. In some implementations, an operational focus or a visual focus can be displayed in a VR scenario of a VR application. For example, the operational focus can be displayed as a cursor in the VR scenario. The user can control trajectory of the operational focus in the VR scenario through a head posture or a hand gesture, to interact with the VR scenario.

The VR application can track movement of the head or hand of the user by using sensors installed on, or communicably coupled to, the VR device. The VR device can collect and process data corresponding to the user's hand or head movement sensed by the VR sensors. The sensors can include a gyroscope, an accelerometer, a gravity sensor, or a magnetometer.

After collecting the movement data of the head or hand of the user, the VR application can use the data to control the trajectory of operational focus displayed in the VR scenario corresponding to the hand or head movement. For example, the VR device can calculate, based on the collected movement data, offsets of the head or hand of the user with respect to an XY reference frame of the VR scenario, and displace the operational focus based on the calculated offsets.

The VR device can also record the coordinates of the operational focus in the XY reference frame and generate a trajectory of the operational focus based on the recorded coordinates. After generating the trajectory of the operational focus in the VR scenario, the VR application can detect whether the trajectory passes through the EIR of the virtual element. The VR device can trigger a selection event to select the virtual element if the trajectory passes through the EIR. The trajectory passes through the EIR of the virtual element when the trajectory intersects with the boundary of the EIR for at least two times. From 130, method 100 proceeds to 140.

At 140, if an interaction between the trajectory of the operational focus and the EIR satisfies one or more conditions for triggering a selection event of the virtual button, the virtual element is selected. Various implementations for triggering the selection event are discussed in the descriptions of FIGS. 2-8. After 140, method 100 ends.

Figure 2:
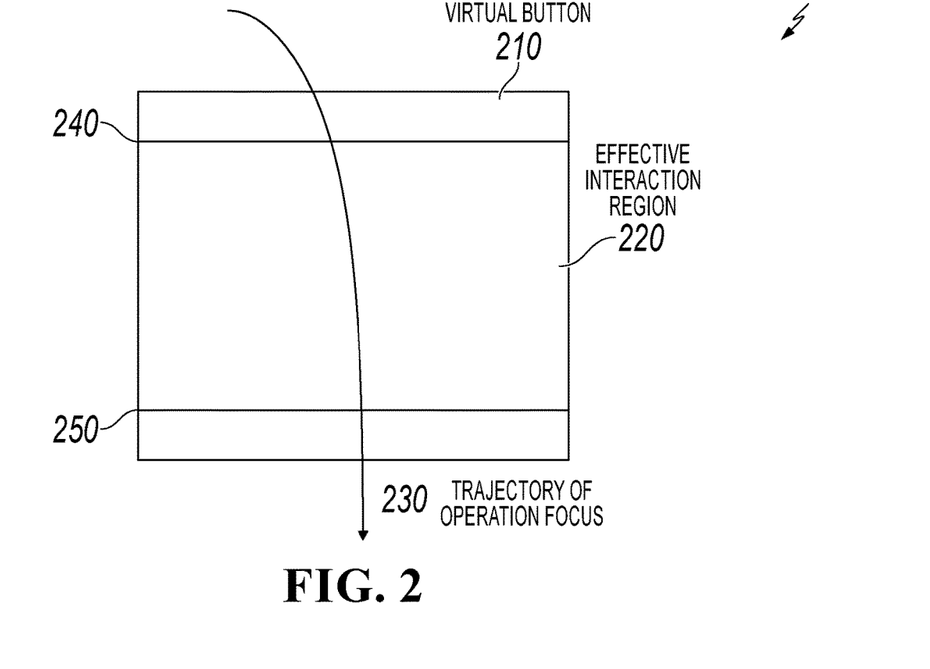
FIG. 2 is a schematic diagram illustrating an example of a trajectory that triggers a selection event of a virtual button by passing through an effective interaction region of the virtual button, according to an implementation of the present disclosure.

FIG. 2 is a schematic diagram illustrating an example 200 of a trajectory that triggers a selection event of a virtual button by passing through an EIR of the virtual button, according to an implementation of the present disclosure. In this example, the virtual button 210 as a rectangular shape. The EIR 220 is a rectangular area with an upper boundary line 240 and a lower boundary line 250 inside the area of the virtual button 210. The trajectory of operational focus 230 intersects with both the upper boundary line 240 and the lower boundary line 250 which can trigger the selection event.

In some implementations, selecting the EIR 220 as a portion of the area covered by the virtual button 210 can reduce the probability that a selection operation is unintentionally triggered. In some implementations, a selection event can be triggered when the trajectory of the operational focus intersects with the boundary of the EIR 220 for more than two times to further reduce unintentional selection of the virtual button.

Figure 3:
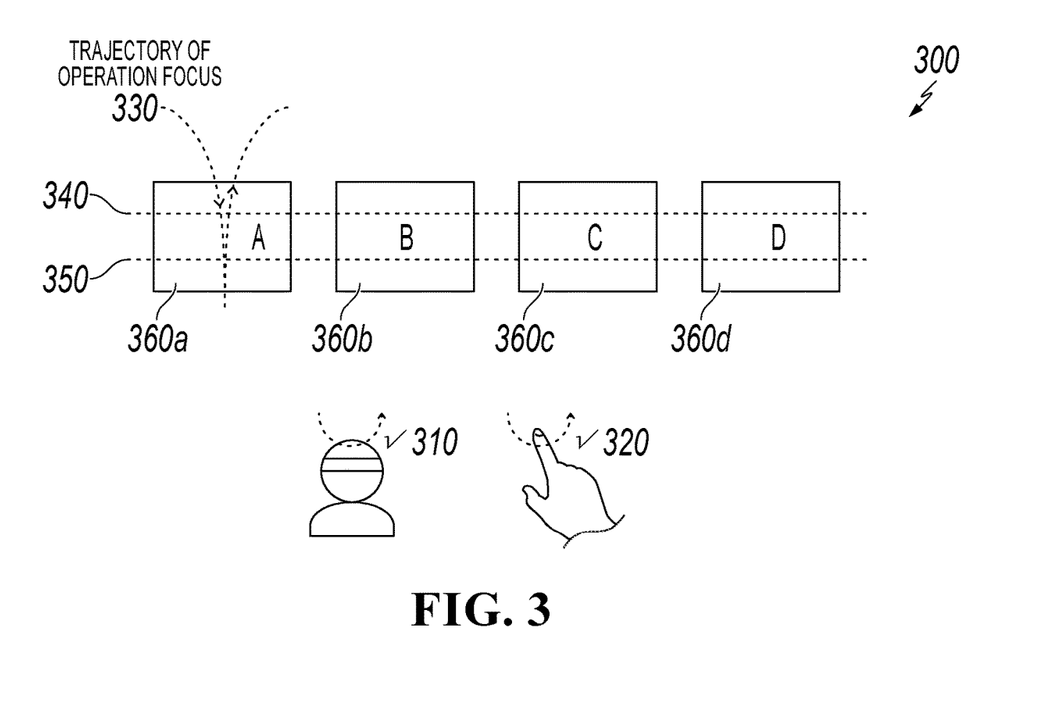
FIG. 3 is a schematic diagram illustrating an example of triggering a selection event of a virtual element, according to an implementation of the present disclosure.

FIG. 3 is a schematic diagram illustrating an example 300 of triggering a selection event of a virtual element, according to an implementation of the present disclosure. In this example 300, the virtual elements can be virtual keys "A" 360a, "B" 360b, "C" 360c, and "D" 360d in a VR scenario. The EIR is the region between the upper boundary 340 dashed line and the lower boundary 350 dashed line. Using selecting the virtual key "A" 360a for example, the trajectory of the operational focus 330 can be controlled by using a "V" shape head posture 310 or hand gesture 320 movement to select the virtual keys. More specifically, the user can control the trajectory of an operational focus 330 to start from above the upper boundary 340, to go downward across both the upper boundary 340 and the lower boundary 350, and go upward above the upper boundary 340. As such, the trajectory of operational focus 330 intersects with the EIR four times.

Figure 4:
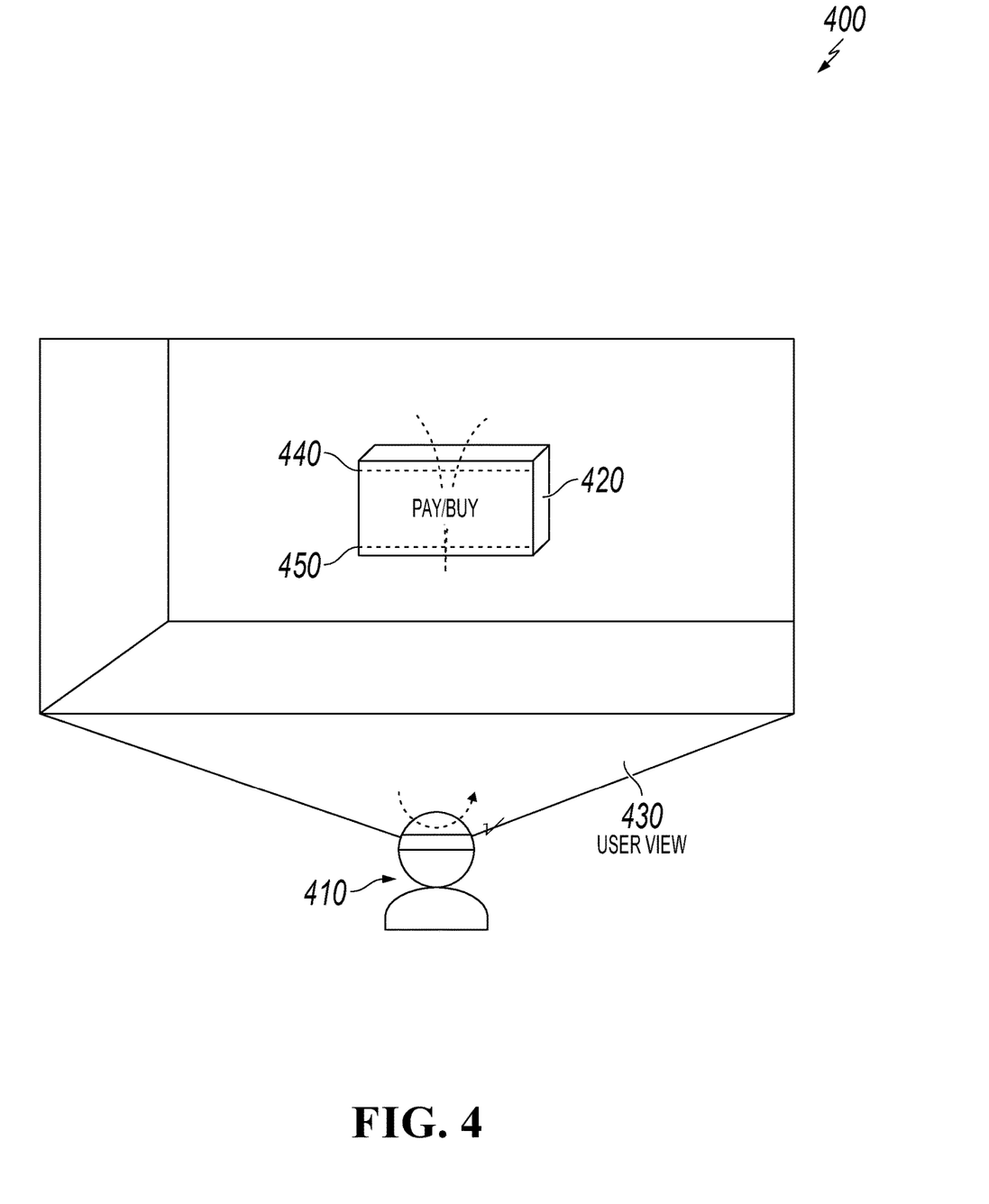
FIG. 4 is a schematic diagram illustrating an example of selecting a virtual element for performing online shopping using a VR application, according to an implementation of the present disclosure.

As another example, a VR device user can use the virtual element selection method to perform online shopping. Referring to FIG. 4, FIG. 4 is a schematic diagram illustrating an example 400 of selecting a virtual element for performing online shopping using a VR application, according to an implementation of the present disclosure. In this example 400, the VR device is a VR headset. A virtual button 420 for buying or paying for an item is shown in the user's view 430 of an online shopping VR scenario. The user 410 wearing the VR headset can perform a "V" shape head movement to move the operational focus across the EIR between the upper boundary 440 and lower boundary 450 inside the area of the virtual button 420 to trigger the selection of buying or paying for the item.

Figure 5:
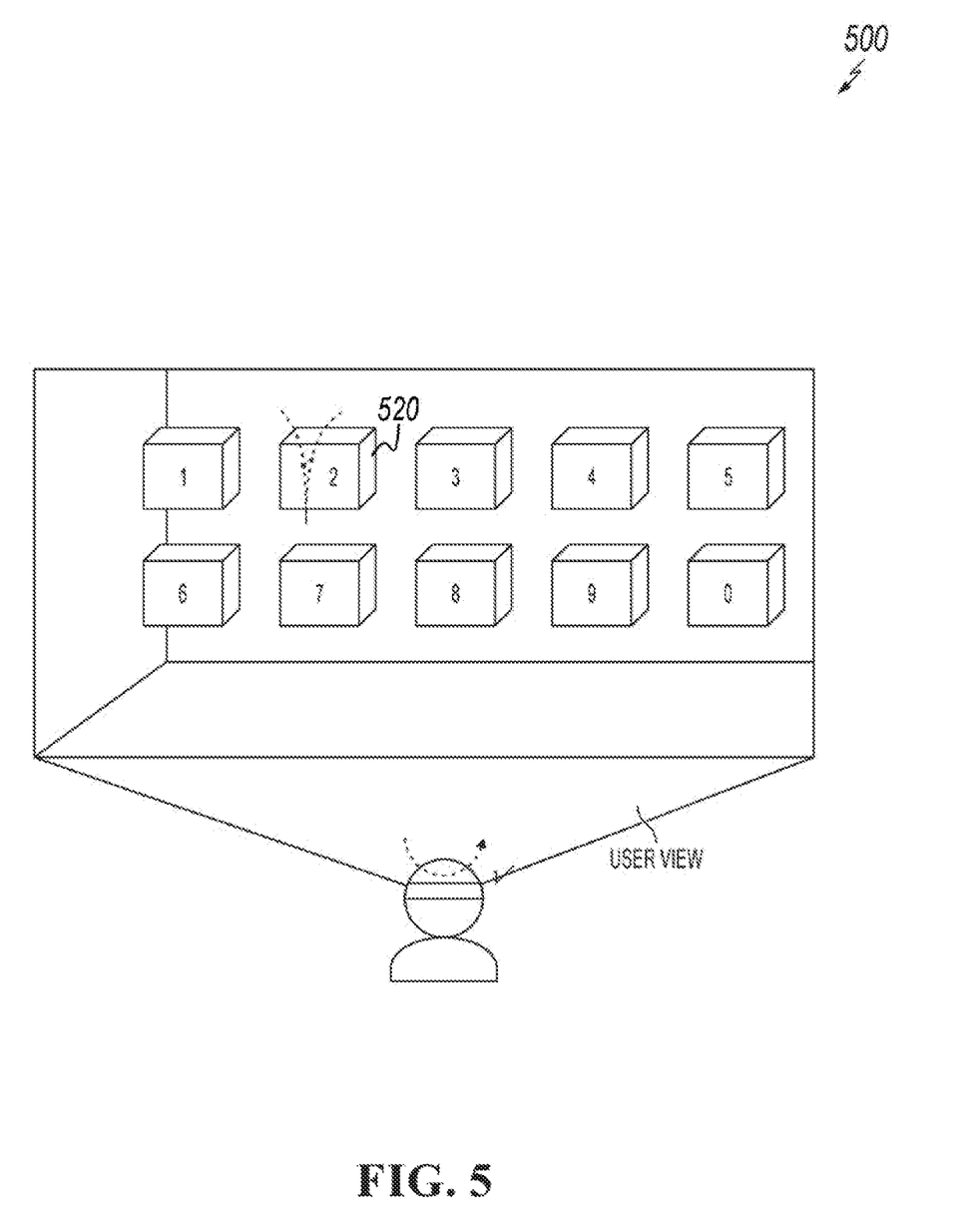
FIG. 5 is a schematic diagram illustrating an example of selecting a virtual key to perform input in an online shopping VR scenario, according to an implementation of the present disclosure.

FIG. 5 is a schematic diagram illustrating an example 500 of selecting a virtual key to perform input in an online shopping VR scenario. Similarly, to input a password or payment amount through a virtual keyboard, the user wearing the VR headset can perform a "V" shape head movement to move the operational focus across the EIR of a virtual key 520 to trigger the selection of the virtual key 520.

Figure 6:
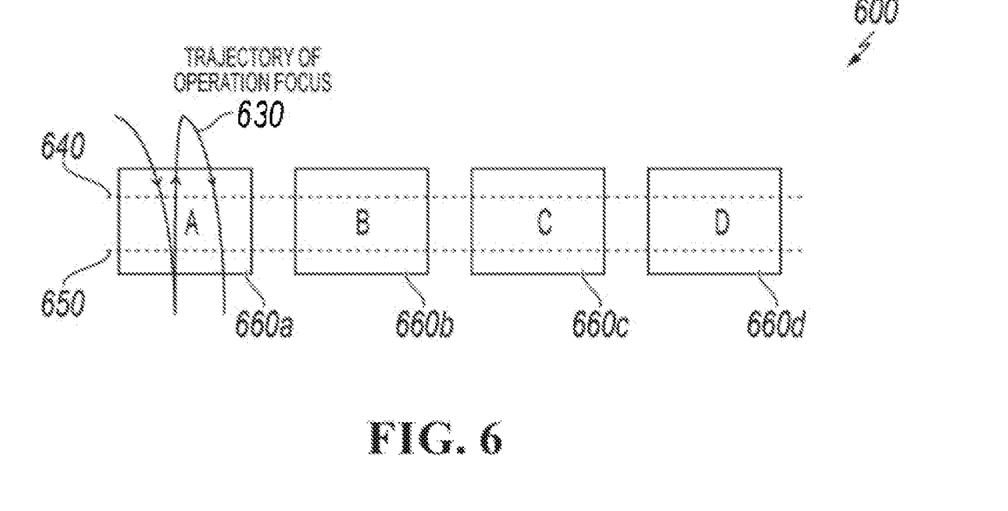
FIG. 6 is a schematic diagram illustrating another example of triggering a selection event of a virtual element, according to an implementation of the present disclosure.

FIG. 6 is a schematic diagram illustrating another example 600 of triggering a selection event of a virtual element, according to an implementation of the present disclosure. In this example, the virtual elements are again the virtual keys "A" 660a, "B" 660b, "C" 660c, and "D" 660d in a VR scenario. The EIR is the region between the upper boundary 640 dashed line and the lower boundary 650 dashed line. Using again the selection of virtual key "A" 640a for example, the user can control the trajectory of an operational focus 630 to start from above the upper boundary 640 to go downward across both the upper boundary 640 and the lower boundary 650, upward above the upper boundary 640, and then downward again, below the lower boundary 650. The selection event of the virtual key "A" 660a can be triggered when the trajectory of operational focus 630 intersects with the upper boundary 640 and lower boundary 650 five times.

Figure 7:
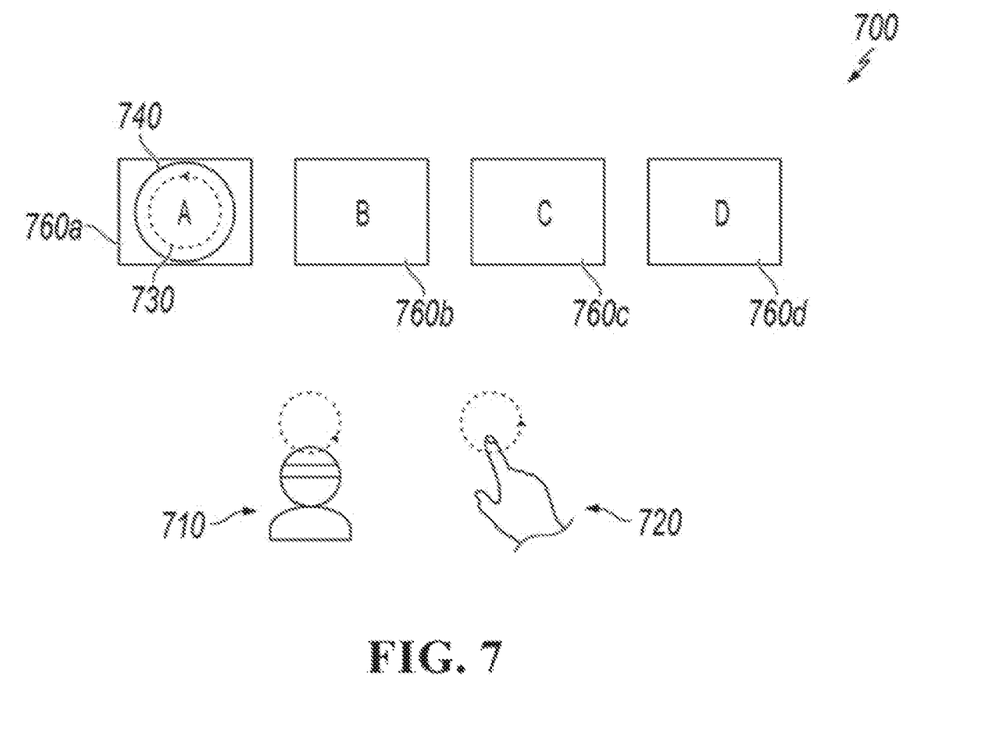
FIG. 7 is a schematic diagram illustrating yet another example of triggering a selection event of a virtual element, according to an implementation of the present disclosure.

FIG. 7 is a schematic diagram illustrating yet another example 700 of triggering a selection event of a virtual element, according to an implementation of the present disclosure. In this example, the virtual elements are again the virtual keys "A" 760a, "B" 760b, "C" 760c, and "D" 760d in a VR scenario. Using again the selection of virtual key "A" 740a for example, the EIR 740 is a circle inside the area of the virtual key "A" 760a. The user can control the trajectory of an operational focus to form an enclosure 730 (for example, a circle) inside the EIR 740 to trigger a selection event that selects the virtual key "A" 760a.

In some implementations, a selection event can be triggered if the area covered by the enclosure 730 is greater than a predetermined percentage of the area of the EIR 740. The calculation of the area of the enclosure 530 and the percentage can be performed by the VR device in the background. In some implementations, the VR device user can use head posture 710 or hand gesture 720 to control the trajectory of the operational focus to form an enclosure in any shape. The selection event can be triggered as long as the area of the enclosure exceeds the predetermined percentage of the area of the EIR.

Figure 8:
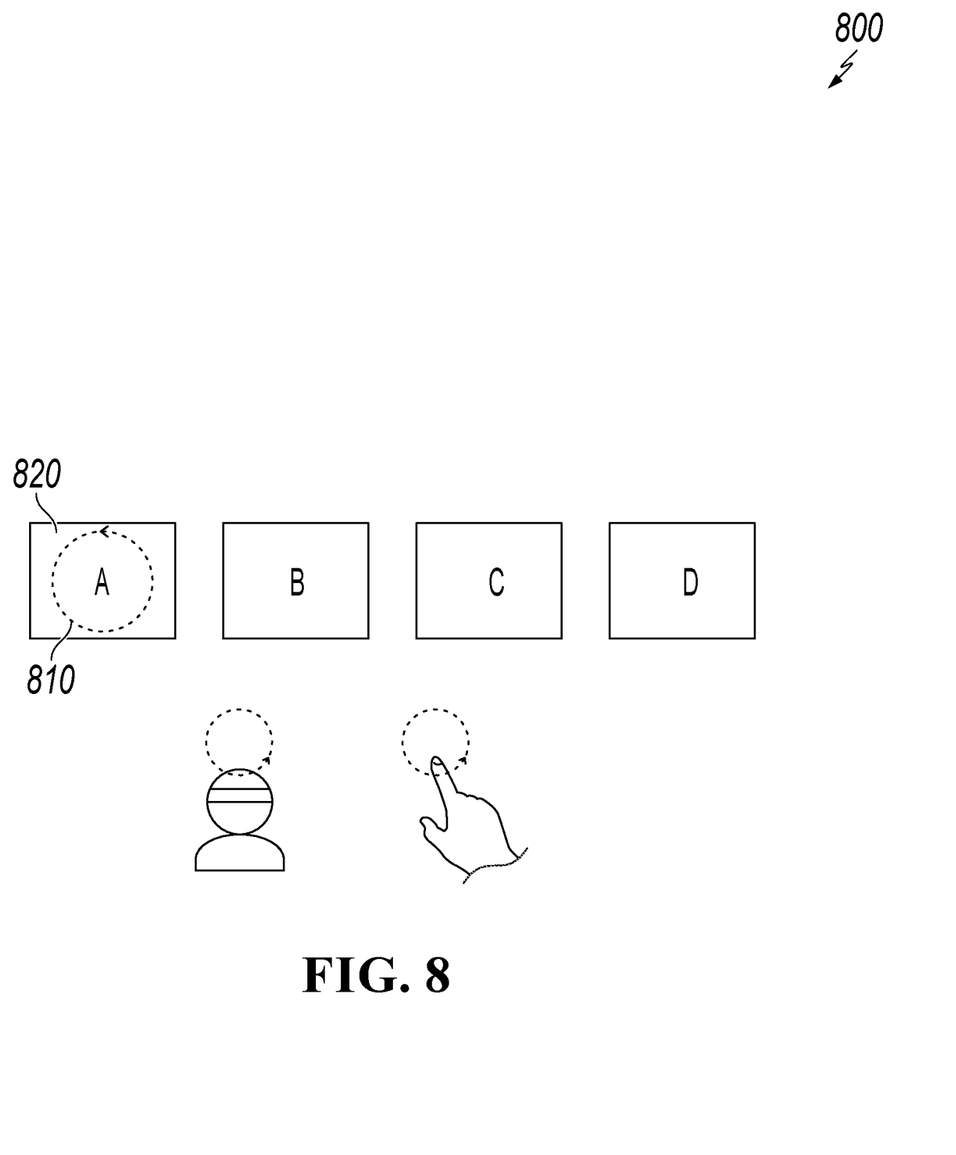
FIG. 8 is a schematic diagram illustrating yet another example of triggering a selection event of a virtual element, according to an implementation of the present disclosure.

Alternatively or additionally, a selection event can be triggered if the trajectory of an operational focus forms an enclosure inside the area of the virtual element or the enclosure exceeds a predetermined percentage of the area of the virtual element. Referring to FIG. 8, FIG. 8 is a schematic diagram illustrating yet another example 800 of triggering a selection event of a virtual element, according to an implementation of the present disclosure. In this example 800, a VR device user can trigger a selection event to select the virtual element 820 by controlling the operational focus to form an enclosure 810 inside the area of the virtual button. In some implementations, a selection event can be triggered if the area covered by the enclosure 810 is greater than a predetermined percentage of the area of the virtual element 820.

In some implementations, to further reduce the possibility of unintentional selection of a virtual element, the virtual element can be selected when the selection event is performed within a predetermined time limit. In other words, the selection event can be triggered only when the duration from the time an operational focus enters an EIR to the completion of the selection event is within the predetermined time limit. For example, in the example 300 discussed in the description of FIG. 3, the "V" shape head posture 310 or hand gesture 320 has to move the operational focus across the upper boundary 340 and lower boundary 350 three times within a pre-determined time period (for example, one second) to trigger the selection event of the virtual element.

The VR application can enable a timer in the background to determine whether the selection event is triggered. Timing can start when the operational focus enters the EIR and ends when the trajectory of the operation satisfies the conditions of a selection event. If the duration is less than or equal to the predetermined time limit for triggering the selection event, the selection event can be triggered and the corresponding virtual element can be selected. Otherwise, the selection event cannot be triggered.

Figure 9:
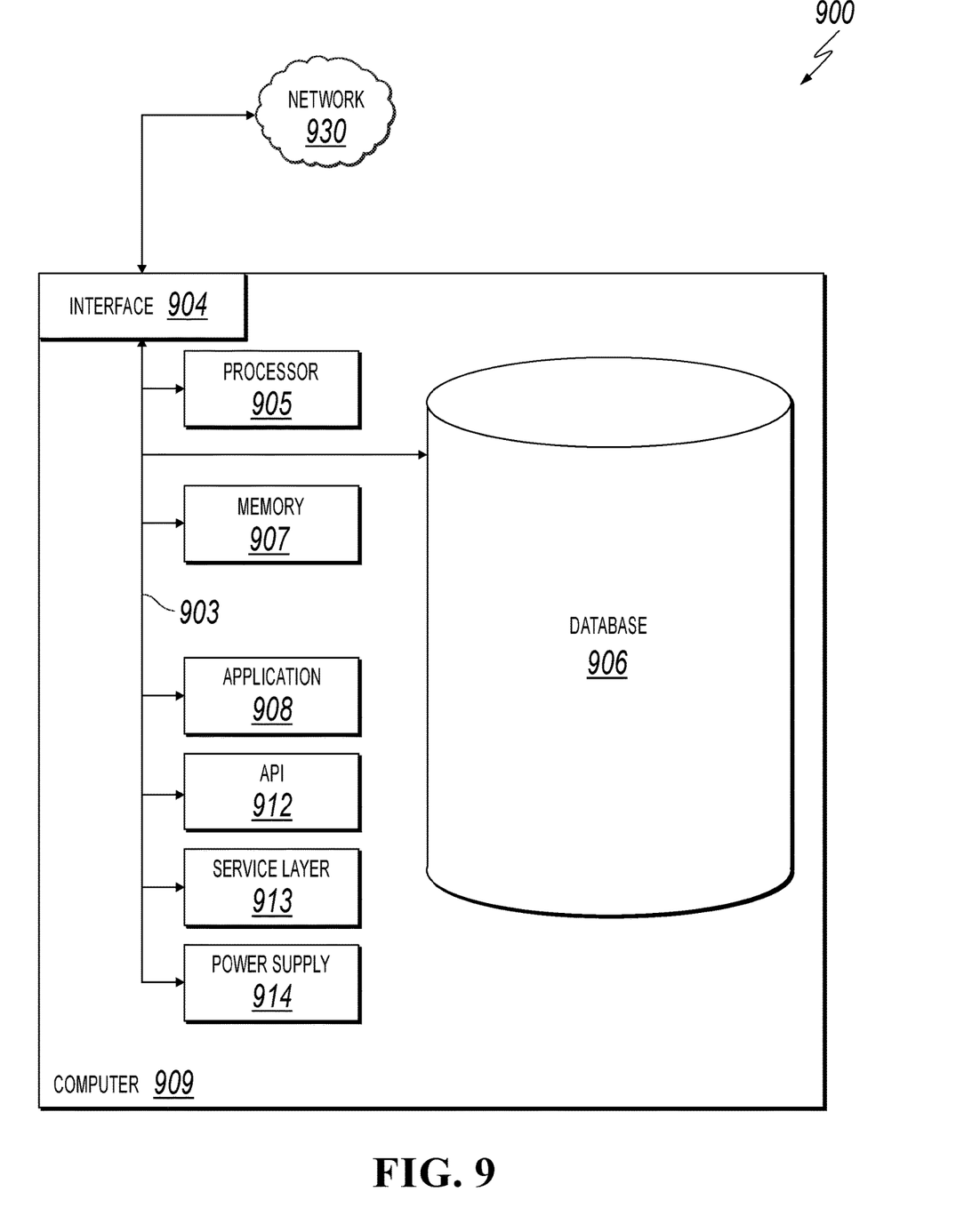
FIG. 9 is a block diagram illustrating an example of a computer-implemented system used to provide computational functionalities associated with described algorithms, methods, functions, processes, flows, and procedures, according to an implementation of the present disclosure.

FIG. 9 is a block diagram illustrating an example of a computer-implemented system 900 used to provide computational functionalities associated with described algorithms, methods, functions, processes, flows, and procedures, according to an implementation of the present disclosure. The illustrated computer 902 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 902 can comprise a computer that includes an input device, such as a keypad, keyboard, touch screen, another input device, or a combination of input devices that can accept user information, and an output device that conveys information associated with the operation of the computer 902, including digital data, visual, audio, another type of information, or a combination of types of information, on a graphical-type user interface (UI) (or GUI) or other UI.

The computer 902 can serve in a role in a computer system as a client, network component, a server, a database or another persistency, another role, or a combination of roles for performing the subject matter described in the present disclosure. The illustrated computer 902 is communicably coupled with a network 930. In some implementations, one or more components of the computer 902 can be configured to operate within an environment, including cloud-computing-based, local, global, another environment, or a combination of environments.

At a high level, the computer 902 is an electronic computing device operable to receive, transmit, process, store, or manage data and information associated with the described subject matter. According to some implementations, the computer 902 can also include, or be communicably coupled with, a server, including an application server, e-mail server, web server, caching server, streaming data server, another server, or a combination of servers.

The computer 902 can receive requests over network 930 (for example, from a client software application executing on another computer 902) and respond to the received requests by processing the received requests using a software application or a combination of software applications. In addition, requests can also be sent to the computer 902 from internal users (for example, from a command console or by another internal access method), external or third-parties, or other entities, individuals, systems, or computers.

Each of the components of the computer 902 can communicate using a system bus 903. In some implementations, any or all of the components of the computer 902, including hardware, software, or a combination of hardware and software, can interface over the system bus 903 using an application programming interface (API) 912, a service layer 913, or a combination of the API 912 and service layer 913. The API 912 can include specifications for routines, data structures, and object classes. The API 912 can be either computer-language independent or dependent and refer to a complete interface, a single function, or even a set of APIs. The service layer 913 provides software services to the computer 902 or other components (whether illustrated or not) that are communicably coupled to the computer 902. The functionality of the computer 902 can be accessible for all service consumers using this service layer. Software services, such as those provided by the service layer 913, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 902, alternative implementations can illustrate the API 912 or the service layer 913 as stand-alone components in relation to other components of the computer 902 or other components (whether illustrated or not) that are communicably coupled to the computer 902. Moreover, any or all parts of the API 912 or the service layer 913 can be implemented as a child or a sub-module of another software module, enterprise application, or hardware module without departing from the scope of the present disclosure.

The computer 902 includes an interface 904. Although illustrated as a single interface 904 in FIG. 9, two or more interfaces 904 can be used according to particular needs, desires, or particular implementations of the computer 902. The interface 904 is used by the computer 902 for communicating with another computing system (whether illustrated or not) that is communicatively linked to the network 930 in a distributed environment. Generally, the interface 904 is operable to communicate with the network 930 and comprises logic encoded in software, hardware, or a combination of software and hardware. More specifically, the interface 904 can comprise software supporting one or more communication protocols associated with communications such that the network 930 or interface's hardware is operable to communicate physical signals within and outside of the illustrated computer 902.

The computer 902 includes a processor 905. Although illustrated as a single processor 905 in FIG. 9, two or more processors can be used according to particular needs, desires, or particular implementations of the computer 902.

Generally, the processor 905 executes instructions and manipulates data to perform the operations of the computer 902 and any algorithms, methods, functions, processes, flows, and procedures as described in the present disclosure.

The computer 902 also includes a database 906 that can hold data for the computer 902, another component communicatively linked to the network 930 (whether illustrated or not), or a combination of the computer 902 and another component. For example, database 906 can be an in-memory, conventional, or another type of database storing data consistent with the present disclosure. In some implementations, database 906 can be a combination of two or more different database types (for example, a hybrid in-memory and conventional database) according to particular needs, desires, or particular implementations of the computer 902 and the described functionality. Although illustrated as a single database 906 in FIG. 9, two or more databases of similar or differing types can be used according to particular needs, desires, or particular implementations of the computer 902 and the described functionality. While database 906 is illustrated as an integral component of the computer 902, in alternative implementations, database 906 can be external to the computer 902.

The computer 902 also includes a memory 907 that can hold data for the computer 902, another component or components communicatively linked to the network 930 (whether illustrated or not), or a combination of the computer 902 and another component. Memory 907 can store any data consistent with the present disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 or similar or differing types can be used according to particular needs, desires, or particular implementations of the computer 902 and the described functionality. While memory 907 is illustrated as an integral component of the computer 902, in alternative implementations, memory 907 can be external to the computer 902.

The application 908 is an algorithmic software engine providing functionality according to particular needs, desires, or particular implementations of the computer 902, particularly with respect to functionality described in the present disclosure. For example, application 908 can serve as one or more components, modules, or applications. Further, although illustrated as a single application 908, the application 908 can be implemented as multiple applications 908 on the computer 902. In addition, although illustrated as integral to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion or management circuits (including recharging, standby, or another power management functionality). In some implementations, the power-supply 914 can include a power plug to allow the computer 902 to be plugged into a wall socket or another power source to, for example, power the computer 902 or recharge a rechargeable battery.

There can be any number of computers 902 associated with, or external to, a computer system containing computer 902, each computer 902 communicating over network 930. Further, the term "client," "user," or other appropriate terminology can be used interchangeably, as appropriate, without departing from the scope of the present disclosure. Moreover, the present disclosure contemplates that many users can use one computer 902, or that one user can use multiple computers 902.

Described implementations of the subject matter can include one or more features, alone or in combination.

For example, in a first implementation, a computer-implemented method, comprising: presenting, by a VR device, a virtual element in a VR scenario of a VR application; determining an effective interaction region EIR of the virtual element that the virtual element can effectively interact with; determining a trajectory of an operational focus of the VR application based on a movement sensed by the VR device; and selecting the virtual element if an interaction between the trajectory of the operational focus and the EIR satisfies one or more conditions for triggering a selection event of the virtual button.

The foregoing and other described implementations can each, optionally, include one or more of the following features:

A first feature, combinable with any of the following features, wherein the EIR overlaps at least a portion of an area of the virtual element.

A second feature, combinable with any of the previous or following features, wherein the movement sensed by the VR device includes at least one of a head movement or a hand movement.

A third feature, combinable with any of the previous or following features, wherein the virtual element is a virtual button or a virtual key that is presented for performing user input.

A fourth feature, combinable with any of the previous or following features, wherein the operational focus is a cursor presented in the virtual scenario and is determined based on a VR device user's visual focus, head position, or hand position.

A fifth feature, combinable with any of the previous or following features, wherein the one or more conditions of the interaction include the trajectory intersects with one or more boundaries of the EIR for at least two times.

A sixth feature, combinable with any of the previous or following features, wherein the one or more conditions of the interaction include the trajectory of the operational focus forms an enclosure in the EIR.

A seventh feature, combinable with any of the previous or following features, wherein the area of the enclosure is greater than a predetermined percentage of an area of the EIR.

An eighth feature, combinable with any of the previous or following features, wherein the one or more conditions of the interaction include that the interaction is performed in a time period less than or equal to a predetermined time limit.

In a second implementation, a computer-readable medium storing one or more instructions executable by a computer system to perform operations comprising: presenting, by a VR device, a virtual element in a VR scenario of a VR application; determining an EIR of the virtual element that the virtual element can effectively interact with; determining a trajectory of an operational focus of the VR application based on a movement sensed by the VR device; and selecting the virtual element if an interaction between the trajectory of the operational focus and the EIR satisfies one or more conditions for triggering a selection event of the virtual button.

The foregoing and other described implementations can each, optionally, include one or more of the following features:

A first feature, combinable with any of the following features, wherein the EIR overlaps at least a portion of an area of the virtual element.

A second feature, combinable with any of the previous or following features, wherein the movement sensed by the VR device includes at least one of a head movement or a hand movement.

A third feature, combinable with any of the previous or following features, wherein the virtual element is a virtual button or a virtual key that is presented for performing user input.

A fourth feature, combinable with any of the previous or following features, wherein the operational focus is a cursor presented in the virtual scenario and is determined based on a VR device user's visual focus, head position, or hand position.

A fifth feature, combinable with any of the previous or following features, wherein the one or more conditions of the interaction include the trajectory intersects with one or more boundaries of the EIR for at least two times.

A sixth feature, combinable with any of the previous or following features, wherein the one or more conditions of the interaction include the trajectory of the operational focus forms an enclosure in the EIR.

A seventh feature, combinable with any of the previous or following features, wherein the area of the enclosure is greater than a predetermined percentage of an area of the EIR.

An eighth feature, combinable with any of the previous or following features, wherein the one or more conditions of the interaction include that the interaction is performed in a time period less than or equal to a predetermined time limit.

In a third implementations, a computer-implemented system, comprising: one or more computers; and one or more computer memory devices interoperably coupled with the one or more computers and having tangible, non-transitory, machine-readable media storing one or more instructions that, when executed by the one or more computers, perform operations comprising: presenting, by a VR device, a virtual element in a VR scenario of a VR application; determining an EIR of the virtual element that the virtual element can effectively interact with; determining a trajectory of an operational focus of the VR application based on a movement sensed by the VR device; and selecting the virtual element if an interaction between the trajectory of the operational focus and the EIR satisfies one or more conditions for triggering a selection event of the virtual button.

The foregoing and other described implementations can each, optionally, include one or more of the following features:

A first feature, combinable with any of the following features, wherein the EIR overlaps at least a portion of an area of the virtual element.

A second feature, combinable with any of the previous or following features, wherein the movement sensed by the VR device includes at least one of a head movement or a hand movement.

A third feature, combinable with any of the previous or following features, wherein the virtual element is a virtual button or a virtual key that is presented for performing user input.

A fourth feature, combinable with any of the previous or following features, wherein the operational focus is a cursor presented in the virtual scenario and is determined based on a VR device user's visual focus, head position, or hand position.

A fifth feature, combinable with any of the previous or following features, wherein the one or more conditions of the interaction include the trajectory intersects with one or more boundaries of the EIR for at least two times.

A sixth feature, combinable with any of the previous or following features, wherein the one or more conditions of the interaction include the trajectory of the operational focus forms an enclosure in the EIR.

A seventh feature, combinable with any of the previous or following features, wherein the area of the enclosure is greater than a predetermined percentage of an area of the EIR.

An eighth feature, combinable with any of the previous or following features, wherein the one or more conditions of the interaction include that the interaction is performed in a time period less than or equal to a predetermined time limit.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/− R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   generating, by a virtual reality (VR) device, a plurality of VR scenarios;
   presenting, by a VR application operating on the VR device, one VR scenario of the plurality of VR scenarios that includes a polygonal shaped virtual element configured to interact with the VR application;
   determining an effective interaction region (EIR) of the virtual element that the virtual element can effectively interact with, the EIR having a circular shape with a diameter not greater than a shortest side length of the virtual element;
   determining a trajectory of an operational focus of the VR application based on a movement sensed by the VR device;
   determining, by enabling a timer by the VR application operating on the VR device, a duration of time from when the operational focus enters the EIR to when an area of enclosure of the operational focus bound within the EIR is greater than a predetermined percentage of an area of the EIR;
   selecting the virtual element when the duration of time is less than or equal to a predetermined time limit;
   in response to selecting the virtual element, initiating a payment service associated with the VR application; and
   presenting, by the VR device, an input interface in the one VR scenario to receive payment service information associated with the payment service.

2. The computer-implemented method of claim 1, wherein the area of enclosure of the operational focus bound within the EIR and the predetermined percentage of an area of the EIR is determined by the VR device.

3. The computer-implemented method of claim 1, wherein the trajectory of the operational focus of the VR application is based upon one of a hand movement and head movement sensed by the VR device.

4. A non-transitory, computer-readable medium storing one or more instructions executable by a computer system to perform operations comprising:
   generating, by a virtual reality (VR) device, a plurality of VR scenarios;

presenting, by a VR application operating on the VR device, one of the VR scenarios that includes a polygonal shaped virtual element configured to interact with the VR application;

determining an effective interaction region (EIR) of the virtual element that the virtual element can effectively interact with, the EIR having a circular shape with a diameter not greater than a shorted side length of the virtual element;

determining a trajectory of an operational focus of the VR application based on a movement sensed by the VR device;

determining, by enabling a timer by the VR application operating on the VR device, a duration of time from when the operational focus enters the EIR to when an area of enclosure of the operational focus bound within the EIR is greater than a predetermined percentage of an area of the EIR;

selecting the virtual element when the duration of time is less than or equal to a predetermined time limit;

in response to selecting the virtual element, initiating a payment service associated with the VR application; and presenting, by the VR device, an input interface in the one VR scenario to receive payment service information associated with the payment service.

5. The non-transitory, computer-readable medium of claim 4, wherein the area of enclosure of the operational focus bound within the EIR and the predetermined percentage of the area of the EIR is determined by the VR device.

6. The non-transitory, computer-readable medium of claim 4, wherein the trajectory of the operational focus of the VR application is based upon one of a hand movement and a head movement sensed by the VR device.

7. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:

generating, by a virtual reality (VR) device, a plurality of VR scenarios;

presenting, by a VR application operating on the VR device, one of the VR scenarios that includes a polygonal shaped virtual element configured to interact with the VR application;

determining an effective interaction region (EIR) of the virtual element that the virtual element can effectively interact with, the EIR having a circular shape with a diameter not greater than a shortest side length of the virtual element;

determining a trajectory of an operational focus of the VR application based on a movement sensed by the VR device;

determining, by enabling a timer by the VR application operating on the VR device, a duration of time from when the operational focus enters the EIR to when an area of enclosure of the operational focus bound within the EIR is greater than a predetermined percentage of an area of the EIR;

selecting the virtual element when the duration of time is less than or equal to a predetermined time limit;

in response to selecting the virtual element, initiating a payment service associated with the VR application; and presenting, by the VR device, an input interface in the VR scenario to receive payment service information associated with the payment service.

8. The computer-implemented system of claim 7, wherein the area of enclosure of the operational focus bound within the EIR and the predetermined percentage of the area of the EIR is determined by the VR device.

* * * * *